US012276390B1

(12) United States Patent
Baker et al.

(10) Patent No.: US 12,276,390 B1
(45) Date of Patent: Apr. 15, 2025

(54) AUXILLIARY ILLUMINATION ASSEMBLY FOR A VEHICLE

(71) Applicant: EMERGENCY TECHNOLOGY, INC., Hudsonville, MI (US)

(72) Inventors: Douglas V. Baker, Hudsonville, MI (US); James William Kulaga, Hudsonville, MI (US); Patrick James Eiswerth, Grand Rapids, MI (US); Weston Harness, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 0 days.

(21) Appl. No.: 18/496,321

(22) Filed: Oct. 27, 2023

(51) Int. Cl.
| | | |
|---|---|---|
| F21S 41/657 | (2018.01) | |
| B60Q 1/00 | (2006.01) | |
| B60Q 1/18 | (2006.01) | |
| E01H 5/06 | (2006.01) | |

(52) U.S. Cl.
CPC .......... *F21S 41/657* (2018.01); *B60Q 1/0035* (2013.01); *B60Q 1/18* (2013.01); *E01H 5/066* (2013.01)

(58) Field of Classification Search
CPC ........ F21S 41/657; F21S 41/00; F21S 41/663; B60Q 1/0035; B60Q 1/18; B60Q 1/02; B60Q 1/16; B60Q 1/0483; B60Q 1/2696; E01H 5/066; E01H 5/00; F21Y 2115/10
See application file for complete search history.

(56) References Cited

U.S. PATENT DOCUMENTS

| | | | | |
|---|---|---|---|---|
| 1,959,830 | A * | 5/1934 | Rieck, Jr. ................ | F21S 41/00 362/243 |
| 2,054,709 | A * | 9/1936 | Nielsen .................... | B60Q 1/24 362/249.11 |
| 3,038,063 | A * | 6/1962 | Murphy ............... | B60Q 1/0058 362/227 |
| 6,154,122 | A * | 11/2000 | Menze .................... | E01H 5/066 340/425.5 |
| 9,322,141 | B2 * | 4/2016 | Tykalsky ............. | B60Q 1/0035 |
| 10,308,170 | B2 * | 6/2019 | Orazem ............... | B60Q 1/0088 |
| 11,352,756 | B2 * | 6/2022 | Cristofaro ............... | E01H 5/061 |

FOREIGN PATENT DOCUMENTS

CN             112082136           * 12/2020    .............. F21Y 21/15

OTHER PUBLICATIONS

CN 112082136, E Deering, Dec. 15, 2020, English Translation (Year: 2020).*

* cited by examiner

*Primary Examiner* — Ismael Negron
(74) *Attorney, Agent, or Firm* — McGarry Bair PC

(57) ABSTRACT

An illumination assembly is configured for providing auxiliary illumination for use with a vehicle. The illumination assembly includes a housing. The housing defines an interior with an open face. A frame is provided at the open face. A lens cover is coupled to the open face and at least partially overlies the frame. An illuminator is at least partially formed by the frame and the lens cover with a light source configured to emit a trajectory of light.

18 Claims, 6 Drawing Sheets

AUXILLIARY ILLUMINATION ASSEMBLY FOR A VEHICLE

BACKGROUND

Lighting and illumination assemblies or systems are included with vehicles or utility vehicles, including trucks, automobiles, watercraft, aircraft, sporting vehicles, or the like. Such lighting and illumination assemblies or systems can function to improve visibility for a vehicle operator, such as a driver, or to improve awareness of a vehicle observer, by making the vehicle more identifiable, such as by drawing an observer's attention to the vehicle.

BRIEF DESCRIPTION

An aspect of the present disclosure relates to an illumination assembly configured for providing auxiliary illumination for use with a vehicle, the illumination assembly including a housing defining an interior with an open face, a frame provided at the open face, a lens cover coupled to the open face and at least partially overlying the frame, a forward illuminator configured to emit a trajectory of light in a forward direction, and a downward illuminator configured to emit a trajectory of light in a downward direction.

Another aspect of the present disclosure relates to a snow plowing assembly for a vehicle, the snow plowing assembly including a plow frame coupling the snow plowing assembly to a vehicle, a plow blade coupled to the plow frame, and at least one illumination assembly configured for providing illumination for the snow plowing assembly. The at least one illumination assembly can include a housing defining an interior with an open face, and a frame provided at the open face and at least partially defining a first illuminator with a light source configured to emit a trajectory of light along a forward illumination axis to define a forward illuminated area and a second illuminator with a light source configured to emit a trajectory of light along a downward illumination axis to define a downward illuminated area.

BRIEF DESCRIPTION OF THE DRAWINGS

A full and enabling disclosure of the present description, including the best mode thereof, directed to one of ordinary skill in the art, is set forth in the specification, which makes reference to the appended figures, in which.

DETAILED DESCRIPTION

Figure 1:
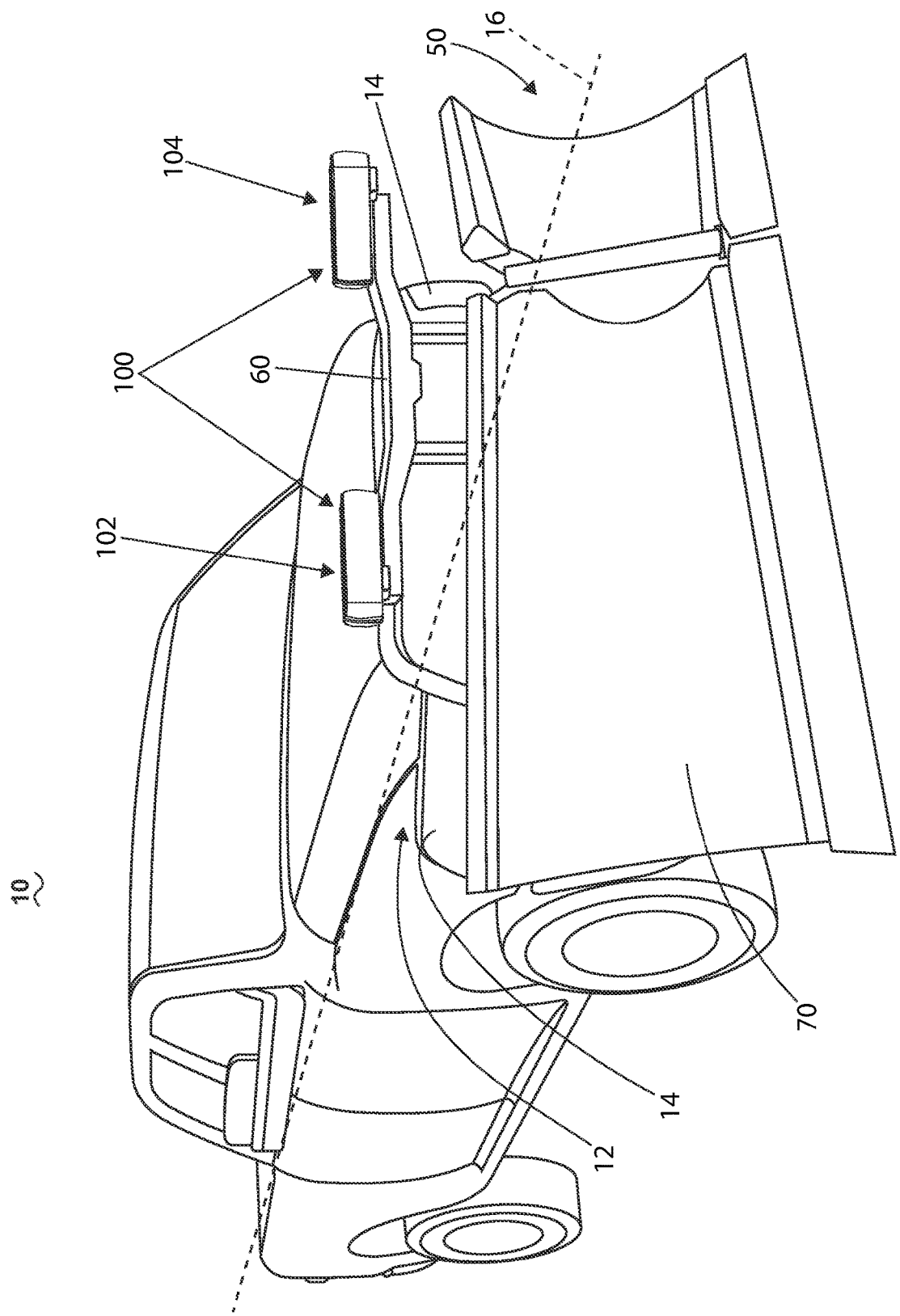
FIG. 1 is a schematic perspective illustration of a vehicle including an illumination assembly, according to an aspect of the present disclosure.

Aspects of the disclosure can be implemented in any environment suitable for illumination, illumination accessory, lighting elements, or the like. One non-limiting example of a stated environment can include, but is not limited to a vehicle, for performing an illumination task or achieving an illumination goal for the vehicle. Non-limiting examples of vehicles can include, but are not limited to, automobiles, aircraft, watercraft, manned or autonomously-controlled vehicles, sport utility vehicles, off-road vehicles, utility vehicles, emergency vehicles, specific-purpose machines or vehicles (farming equipment, construction vehicles, or the like), or the like. In another, or an additional, example, non-limiting aspects of the disclosure can be included with vehicles including, fitted with, or otherwise carrying additional components or mounts (hereafter, "vehicle accessories"), such as spades, shovels, plows, digging or earth-moving components, mounts or assemblies of one or more of these examples, or the like. In this sense, non-limiting aspects of the disclosure can be included where, for example, aspects of the disclosure can be implemented on, at, or with the vehicle, on, at, or with a set of vehicle accessories, or a combination thereof.

As used herein, the term "set" or a "set" of elements can be any number of elements, including only one. As used herein, the terms "axial" or "axially" refer to a dimension along an axis of a component referenced. The term "forward" used in conjunction with "axial" or "axially" refers to moving in a direction toward another component or point of reference (such a direction of movement or traversal). The term "rear," "rearward," or the like, when used in conjunction with "axial" or "axially" refers a direction away or distal from another component or point of reference (such a direction of movement or traversal).

Additionally, as used herein, the terms "radial" or "radially" refer to a direction away from a common center or axis. For example, in the overall context of one non-limiting example of an automobile, a major longitudinal axis can be defined through the center of the automobile and extending from the front of the automobile (relative to the direction of forward travel) through the rear of the vehicle. In this example, radial can refer to a direction extending away from the longitudinal axis of the automobile, such as laterally (with reference to, for example, Earth horizon) along the vehicle, toward an axial edge, such as a surface including door handles (e.g., perpendicular to the major longitudinal axis). The use of the terms "proximal" or "proximally," either by themselves or in conjunction with the terms "radial" or "radially," refers to moving in a direction toward the center longitudinal axis, or a component being relatively closer to the center longitudinal axis as compared to another component.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms such as "voltage", "current", and "power" can be used herein, it will be evident to one skilled in the art that these terms can be interrelated when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

As used herein, a "module" that includes or incorporates, runs, operates, or otherwise executes or produces a functional operation or operative outcome, can be incorporated within or included by way of program code stored in a memory or executed by a controller module or processor.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 illustrates a schematic representation of a vehicle 10, such as, but not limited to, a utility vehicle, a truck, or other suitable type of vehicle for use by an operator, driver, or the like. In one non-limiting example, the utility vehicle can include a snow plow, a shovel, or another component mounted at or proximate to a front 12 of the vehicle for use in operation to perform a vehicle function, such as moving snow. Additional examples of vehicles, additional components, or operations are envisioned incorporating aspects of the disclosure. In the illustrated non-limiting example, the vehicle can include a snow plow assembly 50 mounted on, at, or otherwise with the vehicle 10. In non-limiting examples, the snow plow assembly 50 can be mounted or supported by the vehicle 10 by way of mechanical attachment with one or more aspects of the vehicle 10 frame or chassis (not shown). Mounting or attaching aspects of the snow plow assembly 50 are not germane to aspects of the disclosure.

In non-limiting examples of the disclosure, the snow plowing assembly 50 can include a structural plow frame 60, mounted or mechanically coupled with the vehicle 10, a shovel or plow blade 70 supported by the plow frame 60, and a set of illumination assemblies 100, shown as two illumination assemblies 100 or a pair of illumination assemblies 100. By way of non-limiting example, the plow blade 70 can include any suitable type or shape of plow blade 70, such as a V-shaped plow blade, an angled or diagonally oriented plow blade, a movable or articulating plow blade, a multiple segment blade, or a combination thereof, and can have any suitable height or width for installation with the vehicle 10, or suitable for operational uses.

The at least one illumination assembly 100 can configured to provide illumination for the vehicle 10 operator, for observers of the vehicle 10, or for operations of the vehicle 10, as described herein. As shown, the set of illumination assemblies 100 can be mounted or mechanically coupled on, at, or with, the plow frame 60, and can be oriented, positioned, directed, or otherwise aligned to illuminate or project illumination or light in at least two directions, as described herein. While the set of illumination assemblies 100 are shown and described as mounted with the plow frame 60, additional non-limiting aspects of the disclosure can be included whereby, for example, the set of illumination assemblies 100 are mounted with additional or alternative supporting mechanical components. For instance, in one non-limiting example, the set of illumination assemblies 100 can be mounted with an arm or with respective arms supported by the plow frame 60, the vehicle 10, or a component thereof. As described herein, the mounting or mechanical coupling or fastening of the illumination assemblies 100 can be adapted, configured, oriented, or otherwise positioned such that the set of illumination assemblies 100 are located in a position relative to the vehicle 10, the plow assembly 50, the plow blade 70, or a subset thereof, such that the at least two directions of illumination defined by each of the set of illumination assemblies 100 are directed as described herein, without interruption, interference, or blocking the lighting pattern, in order to enable the operations of the vehicle 10 by the operator, the illumination for the vehicle 10 operator, the illumination for observers of the vehicle 10, or subset or combination thereof.

While not clearly shown in the perspective of FIG. 1, non-limiting aspects of the disclosure can include additional connections for each of the set of illumination assemblies 100 in addition to the mechanical couplings, including but not limited to, a power connection, a grounding connection, one or more control connections, or a combination thereof. Alternatively, or additionally, non-limiting aspects of the disclosure can be included wherein additional wireless, including wireless power transmission or wireless control connections can be enabled for respective power or control connections.

Optionally, the mounting of the at least one illumination device 100 can further include anti-vibration features, structures, locking, retention features, or the like. In another non-limiting example, the mounting, or the set of illumination assemblies 100 can include directional, positional, or "aiming" features for configuration or enabling the projection(s) of light in a suitable or customizable adaption, by way of the mounting of the at least one illumination device 100, or a subcomponent thereof. In such examples where the at least one illumination assembly 100 is mounted on or secured to the snow plowing assembly 50, the at least one illumination assembly 100 can be thought of as forming a part of the snow plowing assembly 50, such that the snow plowing assembly 50 comprises the at least one illumination assembly 100. For example, as shown, the vehicle 10 can include a first illumination assembly 102, or a "left" illumination assembly 102 (relative to the perspective of FIG. 1), and a second illumination assembly 104, or a "right" illumination assembly 104.

In yet another non-limiting aspect of the disclosure, the set of illumination assemblies 100 can further be individually selected or configured such that, for example, a set of illumination assemblies 100, or a pair of illumination assemblies 100, can be matched on a single vehicle 10 in an asymmetrical configuration. For instance, a first illumination assembly 102 can be asymmetric compared with a "matching" or "paired" second illumination assembly 104. This will be understood with respect with their individual positioning relative to the vehicle 10. For instance, a first illumination assembly 102 (for example, the left illumination assembly 102 being left of the front 12 of the vehicle 10, when facing the front 12 of the vehicle 10) can be asymmetrical, in the sense that subcomponents of the lighting assembly 102, such as a turn signal, a lighting element, a mounting fastener, or a combination thereof, are intentionally positioned to be on a distal axial end of a first illumination assembly 102, relative to a longitudinal axis 16 of the vehicle 10, or relative to other subcomponents described. In contrast, an opposite axial end of the first illumination assembly 102, more proximate to or closer to the longitudinal axis 16 of the vehicle 10 could intentionally include different asymmetrical features or configurations. Further yet, a second illumination assembly 104 (for example, a right illumination assembly 104 being right of the front 12 of the vehicle 10, when facing the front 12 of the vehicle 10) can be both asymmetrical and mirrored relative to the arrangement, orientation, or the like, relative to the first illumination assembly 102. Stated another way, a first subcomponent at an axial distal end of the first illumination assembly 102 could mirror a similar first component at an axial distal end of the second illumination assembly 104. In this sense, a "pair" of illumination assemblies 100 can include at least two mirrored asymmetrical configurations, defining the pair.

It will be understood that the at least one illumination assembly 100 can be provided at any suitable location on the vehicle 10 or on the snow plowing assembly 50, such that the illumination assembly 100 provides, enables, or allows for illumination or projection of light to a driver or operator of the vehicle 10, such as during operation of the snow plowing assembly 50. In another example, as explained, the positioning of the illumination assembly 100, relative to the components or subcomponents of the vehicle 10 or plow assembly 50, can further ensure that the projection(s) of light are further not interrupted, blocked, or otherwise prevented by the additional components of the vehicle 10, such as the plow assembly 50. The projections of light can further alert pedestrians, other motorists, or any observers of the light to the presence or operation of the vehicle 10 and the snow plowing assembly 50.

In another non-limiting example aspect of the disclosure, the set of illumination assemblies 100 can be auxiliary illumination assemblies 100, or supplemental illumination assemblies 100. As used herein, "auxiliary" or "supplemental" assemblies indicates that the vehicle 10 can include original equipment manufacturer (OEM) lighting components or elements, and that the set of illumination assemblies 100 can be in addition to the OEM lighting components. In one aspect, the position of the illumination assembly 100 can provide improved performance over traditional vehicle headlight assemblies or OEM lighting previously known to be used with snow plowing assemblies 50, due to the positioning of the illumination assembly 100 being generally higher off the ground and also positioned further forward relative to the vehicle 10, such as forward from such conventional lights, which may be, for example, at least partially obstructed or blocked from projecting light by the plow assembly 50. In yet another non-limiting example, additional vehicle 10 components such as a plow assembly 50 may interfere with, block, or obstruct additional safety lighting, turn signals (in the example of a vehicle 10 with turning signals), warning lighting, or the like.

Figure 2:
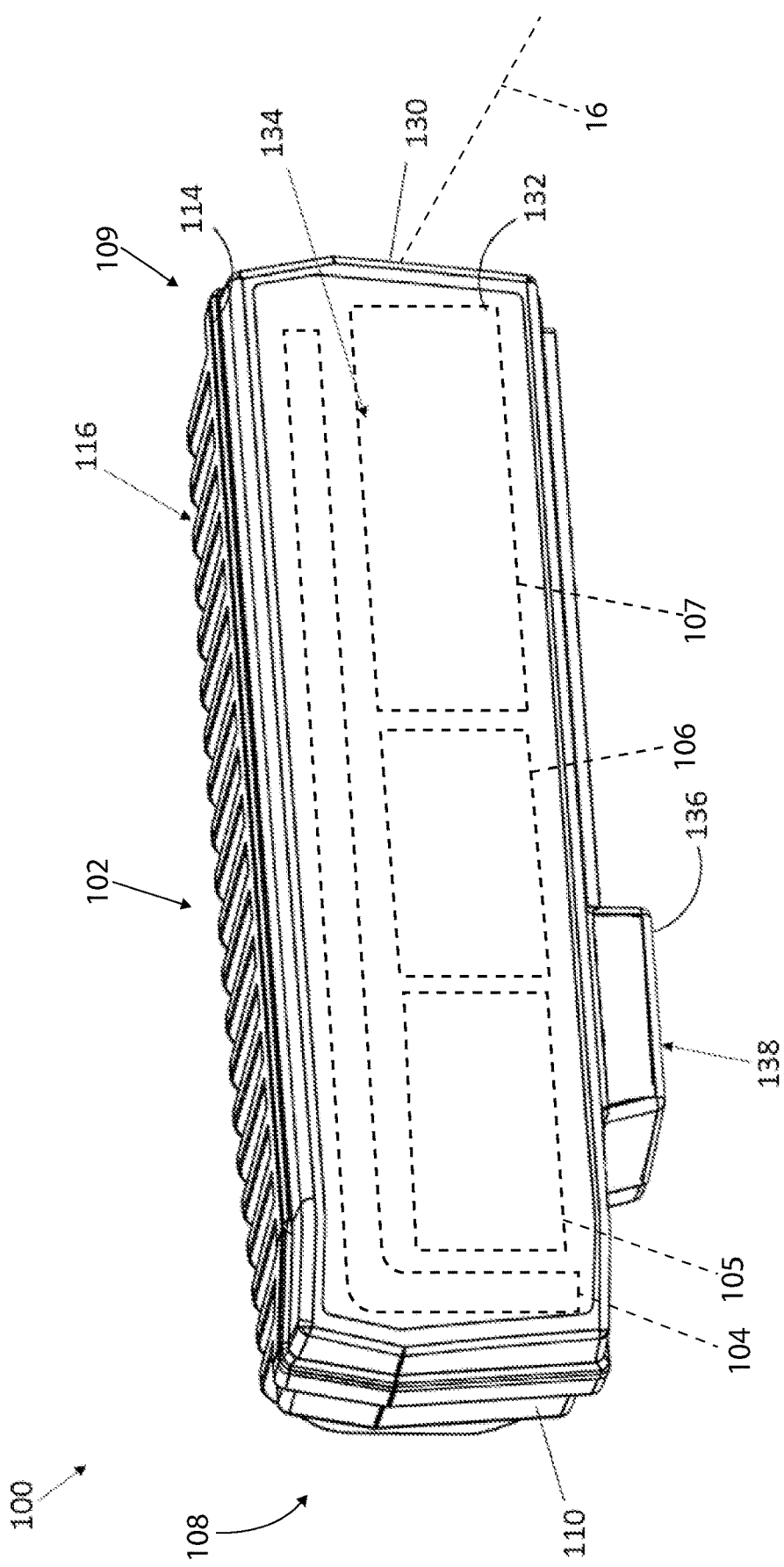
FIG. 2 is a perspective view of the illumination assembly of FIG. 1, according to an aspect of the present disclosure.

Referring now to FIG. 2, one example illumination assembly 100 is shown relative to a representative vehicle longitudinal axis 16, and comprises a housing 110 at least partially defining an interior 112 (FIG. 4) with an open face 114, and a lens cover 130 coupled to the housing 110. The housing 110 can define a symmetrical or evenly distributed shape for the illumination assembly 100, or the housing 110 can have a non-symmetrical shape or a sided shape, as explained herein. For example, as the illustrated illumination assembly 100 is shown laterally left of the axis 16 (relative to the perspective of FIG. 2), the illumination assembly 100 can include the first illumination assembly 102 having an asymmetric orientation of a set or subset of components. In one non-limiting example, a second illumination assembly 104 (FIG. 1) can include a mirrored configuration or assembly, with mirroring relative to the axis 16, or mirrored relative to the axial ends of the first illumination assembly 102. In non-limiting examples, the first and second illumination assemblies 102, 104 can be oriented or arranged, respectively, about additional vehicle 10 features, such as including placement or orientation relative to the driver side or the passenger side of the vehicle 10. In another non-limiting example, the illumination assembly 100 can be mounted or supported (for example, by the plow frame 60 or snow plow assembly 50, neither shown in FIG. 2) such that the illumination assembly 100 has a cantilevered mass. In another non-limiting example, the housing 110 can define or include a cantilevered mass or a reduction in cantilevered mass, based on the composition, composition, construction, or mounting of the housing 110 or illumination assembly 100.

The housing 110 can further define a heat sink 116. As shown, the heat sink 116 can include a rear (in the perspective of FIG. 2) facing housing configured or otherwise adapted to remove heat generated at, by, or within the housing 110 by way of convection, radiation, conduction, or a combination therefor. By way of non-limiting example, it is contemplated that the housing 110 can be formed of an opaque material, while the lens cover 130 is formed of a transparent or at least partially transparent material. It is further contemplated that the housing 110 can be formed of a material that is thermally conductive and dissipative, as well as corrosion resistant, and can define various other structural features, such as for integration of the housing 110 with the lens cover 130, with the heat sink 116, with various electronic, control, or optics elements, or mounting features (including optional alignment or "aiming" features of the illumination assembly 100), such as for mounting or securing the illumination assembly 100 as a whole to the vehicle 10 or to the snow plowing assembly 50. The housing 110 can have a uniform thickness throughout or can have a variable thickness.

Figure 4:
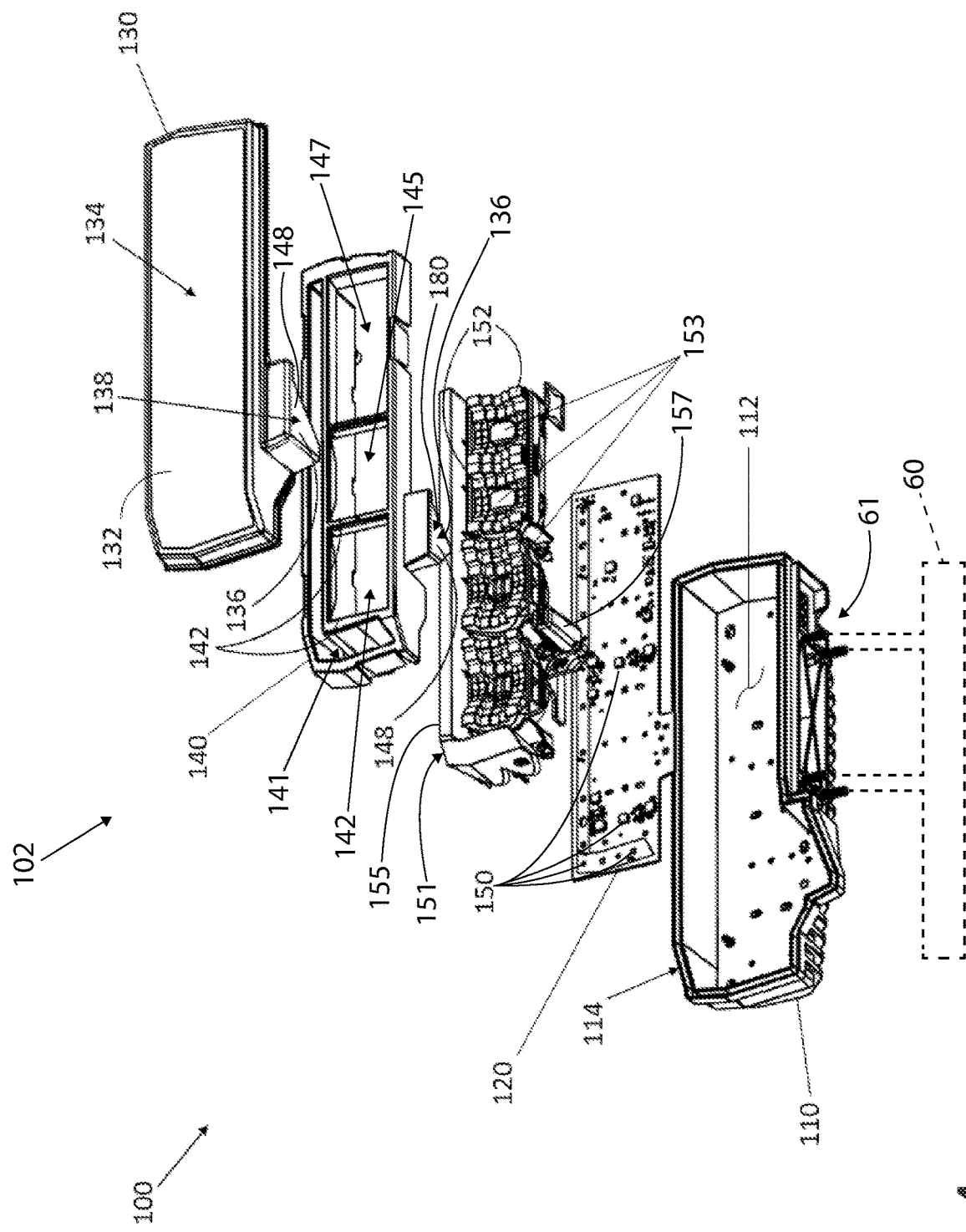
FIG. 4 is a partially exploded perspective view of the illumination assembly of FIG. 1, according to an aspect of the present disclosure.

In the illustrated non-limiting example, the lens cover 130 or lens assembly is coupled to the housing 110 such that the lens cover 130 closes the open face 114 of the housing 110 that provides access to the interior 112 (FIG. 4). The lens cover 130 can be coupled to the housing 110 by any suitable fastening structure or method, non-limiting examples of which include by use of mechanical fasteners separate from the housing 110 and the lens cover 130, by use of mechanical fastening structures or alignment structures or registration features formed by at least one of the housing 110 and the lens cover 130, by an interference, friction, or snap fit between the housing 110 and the lens cover 130, by welding, or by integral forming of the housing 110 with the lens cover 130, etc. It is also contemplated that the lens cover 130 can be configured to couple with a separate, additional protective cover to prevent damage during operation of the vehicle 10 or the snow plowing assembly 50, or the lens cover 130 can be provided with a coating that protects against mechanical or UV exposure. In another non-limiting example, it is also contemplated that the lens cover 130 can be configured to couple with a separate, additional protective cover to prevent damage during non-operation (e.g., storage) of the vehicle 10, the snow plowing assembly 50, or the lens cover 130.

Also, with respect to the perspective of FIG. 2, the lens cover 130 can define a front face 132 and a bottom face 136, as well as at least one planar portion, illustrated herein as a front planar portion 134 of the front face 132 and a bottom planar portion 138 of the bottom face 136. Also illustrated in dotted outline are light-emitting areas, shown as a first area 104, a second area 105, a third area 106, and a fourth area 107. It will be understood that the light-emitting areas 104, 105, 106, 107 are merely representative indication of one non-limiting aspect of a set of areas 104, 105, 106, 107. In non-limiting examples, at least a subset of light-emitting areas 105, 106, 107 can represent or indicate a front-facing light emittance or illumination source, such a daytime running lights, low-bean lights, high-beam lights, or a combination thereof, with respect to the vehicle. In another non-limiting example, another light-emitting area 104 can include an elongated portion or area, including (as shown) a laterally-extending portion and a vertically-extending portion defining a continuous light-emitting area 104, which can represent or indicate a front-facing light emittance, forward illuminator, or illumination source, such a s turn signal indicator. Non-limiting examples of the disclosure can be included wherein, for example, the set or a subset of light-emitting areas 104, 105, 106, 107 can include different, variable, or selectable brightness illumination output(s), different, variable, or selectable color (e.g., light attenuation, filtering of wavelength or wavelength ranges, etc.) output(s), independently controllably (e.g., on/off/color/brightness control), or a combination thereof. Non-limiting aspects of the disclosure can be included wherein the illumination assembly 100 can include at least two different illumination outputs, at least two different illuminators, or the like.

Additionally, while the representative of FIG. 2 illustrates one non-limiting example of the left illumination assembly 102, as explained herein, additional illumination assemblies 100, such as a right illumination assembly 104 (not shown) or another in a pair of illumination assemblies 100 can be mirrored compared to the illustrated example, as explained herein. For instance, while the housing 110 can include a distal end 108 spaced from the vehicle axis 16 and a proximate end 109, more proximate or closer to the vehicle axis 16 than the distal end 108. As shown, a vertical extension of one non-limiting aspect of a light-emitting area 104 can be located proximate to or at the distal end 108, a mirrored illumination assembly 100 or right illumination assembly can reverse the proximate end 109 and distal ends 108 across the vehicle axis 16 or a vertically-extending plane (not shown), such that the vertical extension of light-emitting area 104, the bottom face 136, or a combination thereof, will be located near the distal end 108 of the mirrored illumination assembly 100 on a right-most side (with respect to the perspective of FIG. 2).

The inclusion of the generally smooth front or bottom planar portions 134, 138 can deter or prevent the accumulation or formation of snow or ice on the lens cover 130. It will also be understood that the lens cover 130 is not limited to inclusion of at least one planar portion 134, 138, and instead that at least a portion of the lens cover 130 can have a smooth exterior surface, whether or not such surface is planar or non-planar. The lens cover 130 can have a uniform thickness throughout or can have a variable thickness. In non-limiting examples, a variable thickness or uniform thickness of the lens cover 130 can be selected to define the cantilevered mass of the housing 110 or the illumination assembly 100. The lens cover 130 can have a uniform color throughout (e.g., light attenuation, filtering of wavelength or wavelength ranges, etc.), or can have at least one portion that differs in color from at least one other portion of the lens cover 130. The lens cover 130 can optionally further include logo or branding features, which can appear illuminated depending on their placement on the lens cover 130.

Figure 3:
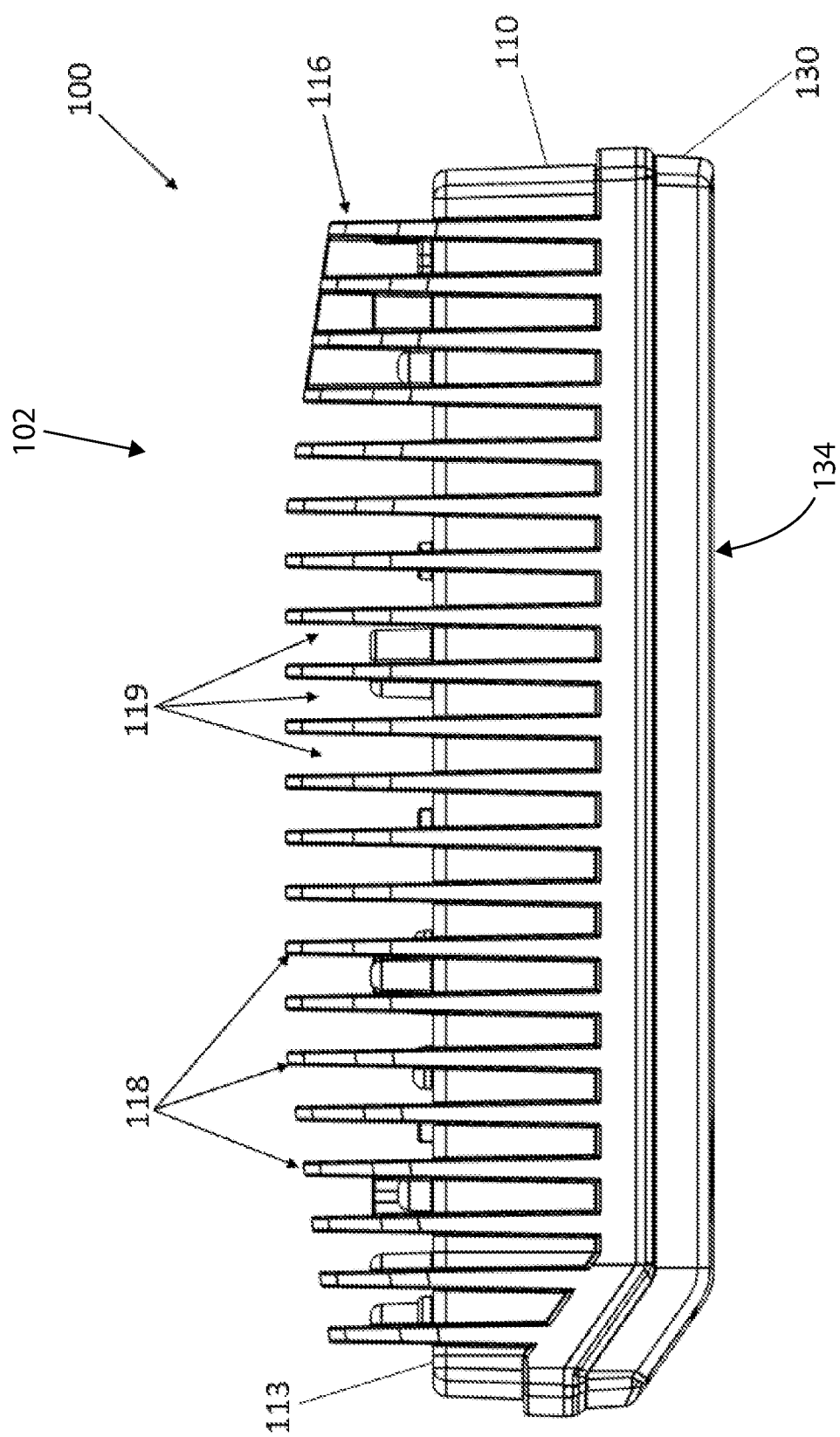
FIG. 3 is a top view of the illumination assembly of FIG. 1, according to an aspect of the present disclosure.

In the top view of FIG. 3, the structure of the heat sink 116 portion of the housing 110 can be better seen. In the illustrated non-limiting example, the heat sink 116 comprises a plurality of ribs, plates, or fins 118 spaced from one another to define a plurality of air gaps 119 therebetween to allow for mitigation and distribution of heat generated by the illumination assembly 100 and absorbed by the housing 110. One aspect of the disclosure includes that the fins 118 and air gaps 119 operably results in an increased surface area for heat exchange with the heat sink 116, compared to a solid rear surface or solid rear wall. The plurality of fins 118 extend generally rearwardly from the housing 110, such as from a rear wall 113 of the housing 110. While the heat sink 116 is illustrated herein as comprising the plurality of fins 118, it will be understood that such structure is not limiting and that any suitable structure for the heat sink 116 that allows thermal distribution or thermal exchange with the surrounding environment can be provided.

Referring now to the exploded view of FIG. 4, it can be seen that the illumination assembly 100 further comprises a frame 140 positioned behind the lens cover 130, such as by being located at or at least partially within the open face 114 of the housing, such that the lens cover 130 at least partially overlies the frame 140. The frame 140 at least partially defines at least a set of areas, windows, or illumination openings, shown as a first passthrough 141, a second passthrough 143, a third passthrough 145, and a fourth passthrough 147. While the set of illumination areas 104, 105, 106, 107 (FIG. 2) are not shown in FIG. 4, non-limiting aspects of the disclosure can be included wherein at least a subset of illumination passthroughs 141, 143, 145, 147 are aligned with, in alignment with, or are registered with or two a respective set of subset of the illumination areas 104, 105, 106, 107. Also, as better seen in FIG. 4, at least a portion of the bottom face 136 or bottom planar portion 138 can include a downward-facing illumination area 148. Non-limiting aspects of the disclosure can also include at least one downward-facing passthrough 180, areas of illumination, or the like. As illustrated, at least a subset of illumination passthroughs 141, 143, 145, 147, 180 can include an opening defined by the frame 140.

The illumination assembly 100 further comprises a printed circuit board (PCB) 120 received within the interior 112 of the housing 110, and can include at least one light source 150 are operably and electrically coupled with the PCB 120. The light sources 150 can be any suitable type of light source, non-limiting examples of which include light bulbs, light emitting diodes (LEDs), which can be uniform or can vary in color, combinations of colors, intensity, etc.

The at least one light source 150, including a set of light sources 150, is provided with and at least partially aligned with, registered to, a lens housing 151 defining a least a corresponding set of lens 153, reflector elements 152, light pipes or light guides 155, multi-faceted surfaces, arrays, or a combination thereof, and configured for directing, angling, reflecting, refracting, or otherwise aiming an illumination output from the corresponding at least one light source 150 outward away from the illumination assembly 100, as described herein. In non-limiting examples, aspects of the disclosure can include a corresponding set of lens 153, reflector elements 152, light pipes or light guides 155, multi-faceted surfaces, arrays, or a combination thereof, and configured for directing, angling, reflecting, refracting, or otherwise aiming an illumination output from the corresponding for each light source 150, or for a set or subset of light sources 150. The illumination assembly 100 can further include a lighting element 157 aligned with, registered with, or otherwise associated with at least one light source 150, and configured or arranged to direct, angle, reflect, refract or otherwise aim an illumination output from the corresponding at least one light source 150 downwardly, relative to the illumination assembly 100, such as through the at least one downward-facing passthrough 180. In this sense, the lighting element 157 can be aligned with or registered with the downward-facing passthrough 180.

In another non-limiting example aspect of the disclosure, the at least one light source 150 can define a set of forward-facing illuminators, or a set of "forward illuminators", and a set of downward-facing illuminators, or a set of "downward illuminators". The set of forward-facing illuminators can include, for example, light sources 150 aligned with, registered with, directing, angling, reflecting, refracting, or otherwise aiming an illumination output through at least one of the first passthrough 141, the second passthrough 143, the third passthrough 145, the fourth passthrough 147, or a combination thereof. In this sense, the set of forward-facing illuminators or light sources 150 can be configured or arranged such that an illumination output is projected through the front face 132 of the illumination assembly 100. The set of downward-facing illuminators can include, for example, light sources 150 aligned with, registered with, directing, angling, reflecting, refracting, or otherwise aiming an illumination output through the at least one downward-facing passthrough 180. In this sense, the set of downward-facing illuminators or light sources 150 can be configured or arranged such that an illumination output is projected through the bottom face 136 of the illumination assembly 100. For understanding, non-limiting aspects of the disclosure can be included wherein the "forward-facing" or "downward-facing" illuminators are being reference with the direction of illumination output direction, which may include a redirected illumination output, reflected illumination output, refracted illumination output, or the like. Stated another way, a "downward-facing" illuminator can include a light source 150 that originally projects an illumination outward "forward-facing", but where that illumination output is redirected in the downward direction, making it one in the set of downward-facing illuminators, not a forward-facing illuminator. In this sense, the ultimate direction of illumination output is the "facing" being referred to.

While FIG. 4 illustrates one non-limiting set of illumination passthroughs 141, 143, 145, 147, aspects of the disclosure are not limited to only the illustrated example. One or more of the subset of illumination passthroughs 141, 143, 145, 147 can be included in aspects of the disclosure, including different or alternative geometric designs, openings, alignments with respective or alternative subsets of light sources 150, different output purposes (e.g., low-beam forward illuminator, high-beam forward illuminator, turn signal forward illuminator design or placement), or the like.

In another non-limiting example, the set of downward-facing illuminators can be thought of as being collectively formed by the downward illumination area 148 and by at least a portion of the bottom face 136, and optionally by at least a portion of the bottom planar portion 138 of the bottom face 136, of the lens cover 130. In another non-limiting aspect of the disclosure, the set of downward-facing illuminators can be thought of as being collectively formed by at least a subset of sidewalls proximate with or associated with the elements 130, 136, 138, 148, or a subset thereof, described herein. In such an example, where the bottom face 136 of the lens cover 130 at least partially overlies and forms a part of the downward-facing passthrough 180 and the front face 132 of the lens cover 130 at least partially overlies at least one of the set of light sources 150, it is contemplated that the portion of the lens cover 130 forming the bottom face 136 is more transparent than the portion of the lens cover 130 forming the front face 132, though it will be understood that this is not limiting and that the bottom face 136 can be less transparent than the front face 132, or the front face 132 and the bottom face 136 can have the same degree of transparency.

While further shown in dotted outline as one non-limiting example, the illumination assembly 100, such as a portion of the housing 110, can include mounting elements 61, shown aligned with and mountable with an example aspect of a portion of the plow frame 60. The mounting elements 61 can include any form of pins, fasteners, clamps, or the like, enabling the mounting of the illumination assembly 100 with at least a portion of the plow frame 60, the plow assembly 50, or any portion of a vehicle 10. Additionally, or alternatively, as described herein, non-limiting aspects of the disclosure can be included wherein, for example, the mounting elements 61, the housing 110, or the illumination assembly 100 can be directionally, positionally, or otherwise implement an "aiming" feature for configuration or enabling the projection(s) of light in a suitable or customizable adaption, by way of the mounting of the at least one illumination device 100, such as relative to the plow frame 60, the plow assembly 50, or any portion of a vehicle 10, or a subcomponent thereof.

Further by way of non-limiting example, the set of downward-facing illuminators can be configured for or adapted to provide a different type or function of illumination or lighting signal than the set of forward-facing illuminators. For example, while the set, or a subset of, the forward-facing illuminators can be configured, adapted, directed, or otherwise enabled to project light in a forward-facing direction from the vehicle 10, the set of downward-facing illuminators can be configured, adapted, directed, or otherwise enabled to project light in a downward-facing direction from the illumination assembly 100. In non-limiting examples, the downward-facing light output can be utilized by the vehicle operator for, in non-limiting examples, inspection of the vehicle 10, the plow frame 60, the plow assembly 50, or the like, as described herein. Additionally, by being independently controllable from the set of forward-facing illuminators, by providing multiple levels, intensities, or patterns of illumination than the set of forward-facing illuminators, the vehicle 10 operator is enabled to perform additional features due to the use of the illumination assembly 100 described herein, compared with conventional lighting elements.

Further yet by way of non-limiting example, the set of downward-facing illuminators can be configured for or adapted to provide a variety of types or functions of illumination or lighting signals, whether they differ from or are the same as those of the set of forward-facing illuminators, further non-limiting examples of which include focused or spotlighted illumination, wide-angle illumination, such as by way of a 200 degree light implementation, signaling, such as by flashing, sweeping, or synchronization of illumination with controls or other signal lighting either on or off the vehicle 10, illumination in a variety of colors or combinations of colors, such as white, green, red, blue, amber, etc., illumination in the ultraviolet (UV) or infrared (IR) spectrums, illumination controlled by a user-operable switch (not shown) on the illumination assembly 100 for operation of the set of downward-facing illuminators from outside the vehicle 10, illumination that is fixed or removable from the illumination assembly 100, both mechanically and electrically, illumination that includes a visible status LED or indicator associated with the set of downward-facing illuminators to show health or fault of the lighting functions for the set of downward-facing illuminators, such as by color indication or steady vs. pulsing modes of operation to indicate fault detection, illumination that includes a reset function by a pressable button or by an internally sealed switch triggered by a magnetic tool, projection of light in lines or symbols indicating safety zone identification, projection of light produced by modulated laser or static filter/aperture, illumination means equipped with accelerometers for automatic adjusting of the lighting angle or ground height detection means, operation of the illumination by a configurable lighting control system that can include illumination control, such as on/off control or illumination intensity control, based on the detected speed or direction of the movement of the vehicle 10 or weather conditions in the surrounding environment, which can also be tracked in an environmental log and stored in internal memory of the illumination assembly 100 for reference in service or warranty management, operation of the illumination in a minimal or safe state of operation when signal communication with the vehicle 10 is lost, etc. In alternative, or additional, non-limiting examples, aspects of the set of downward-facing illuminators can include safety or maintenance features for a vehicle 10 operator, such as providing illumination to enable inspection of the plow blade 70, the plow frame 60, the plow assembly 70, connections thereof, functions thereof, or couplings thereof with the vehicle 10. In yet another non-limiting example, aspects of the set of downward-facing illuminators can include illumination for user walkways, such as footpaths illumination, for users, pedestrians, or operators of the vehicle 10 and while in proximity of the vehicle 10. In yet another non-limiting aspect of the disclosure, any of the aforementioned illumination activities or illumination functions described here can additionally be controllably operated based on, or in conjunction with, one of more sensors or state sensors (i.e., day/night/light sensors, activity or functional sensors, logic sensors, or the like).

Figure 5:
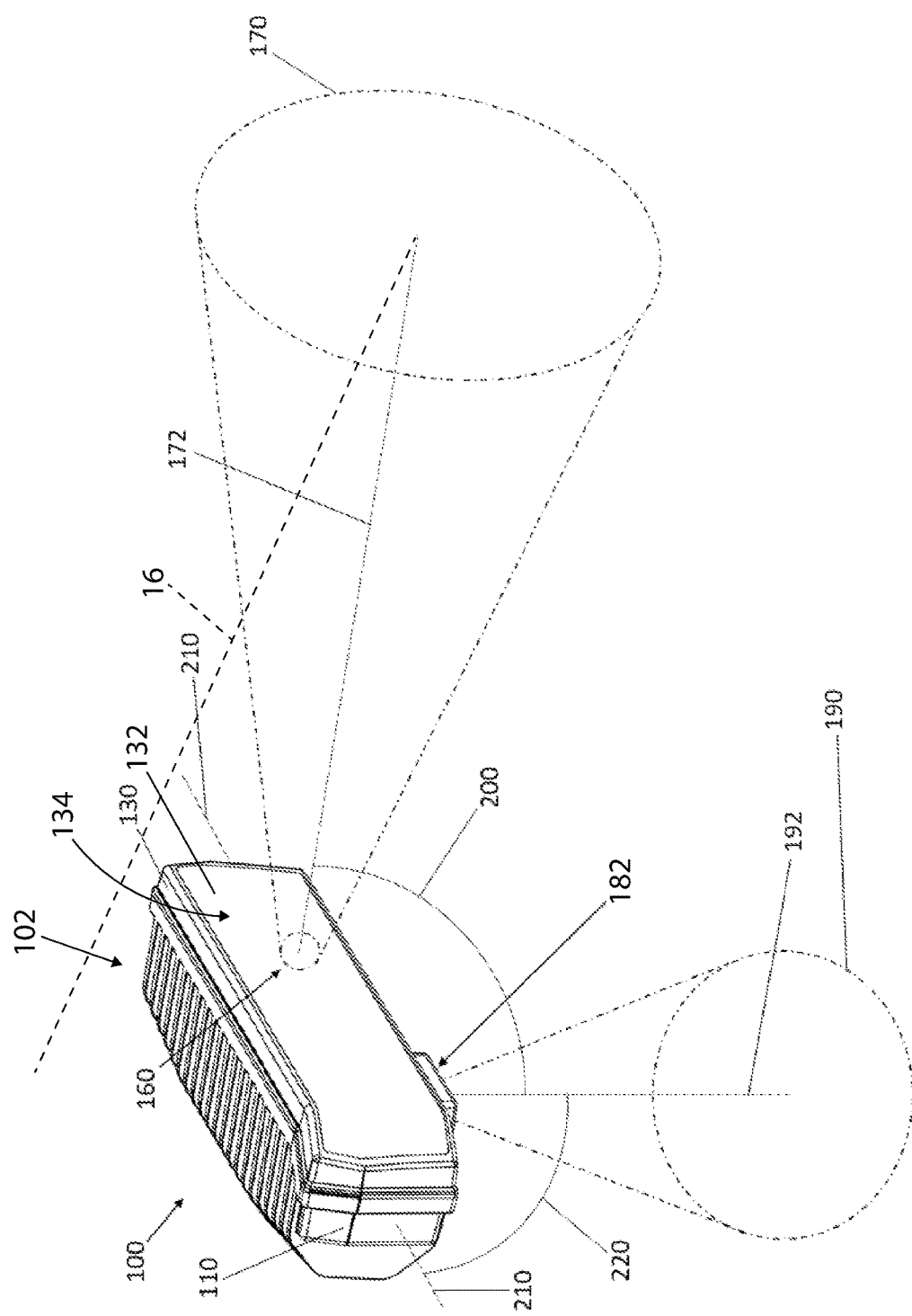
FIG. 5 is a perspective view of the illumination assembly of FIG. 1, illustrating an example illumination pattern, according to an aspect of the present disclosure.

FIG. 5 illustrates non-limiting aspects of the operation of the illumination assembly 100. As shown, a representative forward-facing illuminator 160 can be operated, or is operable to, emit a trajectory of light in a forward illuminated area 170, or illuminating a forward illumination area 170, that can be thought of as being centered about a primary forward illumination axis 172, such that the trajectory of light emitted from the representative forward-facing illuminator 160 follows and defines the forward illumination axis 172. By way of non-limiting example, the forward illumination axis 172 can be thought of as extending in a generally forward direction with respect to the illumination assembly 100, such as through the front face 132 or through the front planar portion 134. Likewise, FIG. 5 illustrates non-limiting aspects of a representative downward-facing illuminator 182 operated or operable to emit a trajectory of light in a downward illuminated area 190 that can be thought of as being centered about a downward illumination axis 192, such that the trajectory of light emitted from the representative downward-facing illuminator 182 follows and defines the downward illumination axis 192. By way of non-limiting example, the downward illumination axis 192 can be thought of as extending in a generally downward direction with respect to the illumination assembly 100. As used herein, "downward" can include facing an Earth horizontal surface, such as ground or a roadway.

An angle 200 defined between the forward illumination axis 172 and the downward illumination axis 192 quantifies the degree of difference between the trajectory of light emitted from the forward-facing illuminators 160 and from the downward-facing illuminators 182. By way of non-limiting example, the angle 200 between the forward illumination axis 172 and the downward illumination axis 192 is at least 15°, further at least 30°, further yet at least 45°, further yet at least 70°, and further yet is approximately 90°. Additionally, or alternatively, by non-limiting example, the angle 200 between the forward illumination axis 172 and the downward illumination axis 192 can include exactly 90°, or can be approximately greater than 90°, is at least 105°, further at least 120°, further yet at least 135°. In another non-limiting example, the angle 200 between the forward illumination axis 172 and the downward illumination axis 192 can be between, or equal to, 85° and 95°.

The trajectory of light emitted from the downward-facing illuminators 182 can further be quantified or thought of in terms of the position of the downward illumination axis 192 with respect to a horizontal plane 210 defined by the illumination assembly 100, such that an angle 220 defined between the downward illumination axis 192 and the horizontal plane 210 quantifies the degree of difference between the trajectory of light emitted from the downward-facing illuminators 182 relative to a lateral trajectory represented by the horizontal plane 210. By way of non-limiting example, the angle 220 between the downward illumination axis 192 and the horizontal plane 210 is at least 15°, further at least 30°, further yet at least 45°, further yet at least 70°, and further yet is approximately 90°. Additionally, or alternatively, by non-limiting example, the angle 220 between the downward illumination axis 192 and the horizontal plane 210 can include exactly 90°, or can be approximately greater than 90°, is at least 105°, further at least 120°, further yet at least 135°.

It is contemplated that the illumination generated from the set the downward-facing illuminators 182, rather than being provided simply as a low or high beam illumination, can comprise a variety of indications or types of illumination, non-limiting examples of which include illumination of a safety symbol option onto the ground, illumination directed toward points of alignment for the snow plow assembly 50, illumination directed toward edges of the snow plow assembly 50 or the plow blade 70, illumination directed toward potential obstacles for the snow plow assembly 50, illumination that is triggered by an event, an operating state (such as an operating state of the vehicle 10), a result of sensors provide a sensed indication of a feature or state, such as unlocking or opening/closing of doors of the vehicle 10, or which duration of illumination can be subject to a configurable timeout after the triggering event, illumination in a maintenance mode of operation, illumination types or patterns indicating or communicating to pedestrians in the area that a snow plowing operation is in progress, illumination indicating a change in orientation or in overall blade width of the plow blade 70 due to movement of the plow blade 70 between alternate positions or orientations, or illumination indicative of ground markings corresponding to the size or footprint of the plow blade 70 relative to a roadway or relative to the vehicle 10, the like, or a combination thereof.

Figure 6:
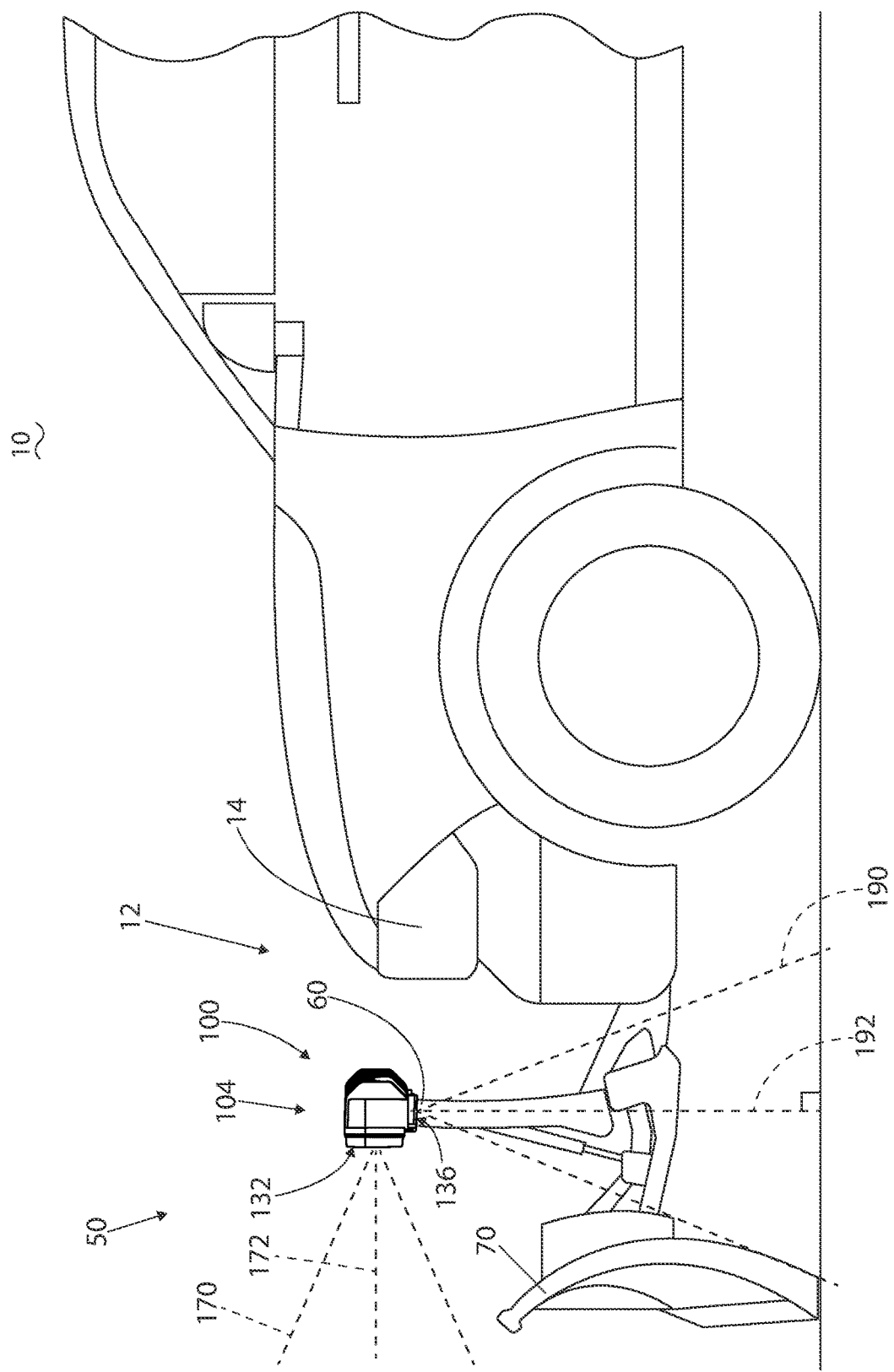
FIG. 6 is a schematic illustration of a side-view of the vehicle of FIG. 1, according to an aspect of the present disclosure.

FIG. 6 illustrates an additional non-limiting side-view example of an illumination assembly 100 included on a vehicle 10, shown as a plow truck. As shown from this perspective, the illumination assembly 100 can include the second illumination assembly 104, or the "right" illumination assembly 104 (e.g., right of center axis of the vehicle 10, axis not shown). In one non-limiting aspect of the disclosure, the downward illuminated area 190 of the set of downward-facing illuminators can be primarily directed to an area behind the plow blade 70 and in front of the front 12 of the vehicle 10. While this one example is illustrated, the downward illumination area 190 can be directed to, or include, additional illumination area than illustrated. Additionally, as shown, the at least one illumination assembly 100 is positioned laterally above the plow blade 70 and such that the trajectory of light along the forward illumination axis 172 illuminates an area beyond, or in front of, the plow blade 70. Stated another way, the at least one illumination assembly 100 can be positioned higher than the plow blade 70 such that at least a portion of the forward illuminated area 170 extends beyond, or in front of, the plow blade 70.

The aspects described herein set forth an illumination assembly that is configured or adapted for mounting to a snow plowing assembly and provides downward illumination for an improved user experience, including improved driver viewability and improved functionality for providing downward illumination of safety symbols for communication to pedestrians, when used with the snow plowing assembly, while still achieving compliance with Department of Transportation (DOT) standards for over-the-road forward lighting providing high beam functions, low beam functions, turn signal functions, and accent lighting functions, as well as having a minimized size, such as height, and including various advanced safety features for on- or off-road use, a controls interface, and onboard processing for configuration settings and error handling, such as a microprocessor or memory system internal to the illumination assembly that allows operation of auxiliary safety features during snow plowing modes of operation, but prevents activation of such off-road features while operating forward lighting in drive modes of operation, to maintain compliance with safety standards, such as DOT standards.

The illumination assembly can also be provided with various other features or functions for improving user experience, such as providing for downwardly-directed safety sensing options, such as for the height of the plow blade or for fault detection for the snow plowing assembly, in addition to the downwardly-directed safety lighting options, the inclusion of measures to prevent buildup of snow or ice on the illumination assembly in colder climates, so as to not block or impede either the illumination or sensing functions associated with the illumination assembly, or the inclusion of additional safety features, while ensuring that such features, such as heating features, do not cause radio frequency (RF) interference (RFI) or electromagnetic interference (EMI) for necessary safety sensors or systems of the illumination assembly.

It will also be understood that various changes or modifications can be made without departing from the spirit of the present disclosure. By way of non-limiting example, although the present disclosure is described for use with a vehicle with a snow plowing assembly installed, it will be recognized that the principles for providing such illumination assemblies can be used with other types of vehicles having other types of installed accessories or packages.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. An illumination assembly configured for providing auxiliary illumination for use with a vehicle, the illumination assembly comprising:
    a housing defining an interior with an open face;
    a frame provided at the open face;
    a lens cover coupled with the housing and closing to the open face and at least partially overlying the frame, the lens cover defining a front face and a bottom face;
    a forward illuminator configured to emit a trajectory of light in a forward direction at least partially defined by the front face; and
    a downward illuminator configured to emit a trajectory of light in a downward direction at least partially defined by the bottom face.

2. The illumination assembly of claim 1 wherein the forward illuminator further includes at least two of a low-beam forward illuminator, a high-beam forward illuminator, and a turn signal forward illuminator.

3. The illumination assembly of claim 1 wherein the downward illuminator is configured to emit a trajectory of light toward an Earth horizontal surface.

4. The illumination assembly of claim 1 wherein the illumination assembly can be directionally mounted relative to the vehicle in order to aim at least one of the trajectory of light in the forward direction or the trajectory of light in the downward direction.

5. The illumination assembly of claim 1 wherein the forward illuminator and the downward illuminator are independently controllable.

6. The illumination assembly of claim 1 wherein the illumination assembly includes a pair of illumination assemblies.

7. The illumination assembly of claim 6 wherein the pair of illumination assemblies are each asymmetrical and mirrored relative to each other.

8. The illumination assembly of claim 1, wherein the vehicle includes a plow assembly.

9. The illumination assembly of claim 8 wherein the illumination assembly is mounted to the plow assembly.

10. The illumination assembly of claim 8 wherein the trajectory of light in the downward direction defines a downward illumination axis primarily directed to an area behind a plow blade of the plow assembly and in front of the vehicle.

11. The illumination assembly of claim 1 wherein the trajectory of light emittable in the forward direction by the forward illuminator defines a forward illumination axis and the trajectory of light emittable in the downward direction by the downward illuminator defines a downward illumination axis.

12. The illumination assembly of claim 11 wherein an angle formed between the forward illumination axis and the downward illumination axis is at least 45°.

13. The illumination assembly of claim 11 wherein an angle formed between the forward illumination axis and the downward illumination axis is between, or equal to, 85° and 95°.

14. A snow plowing assembly for a vehicle, the snow plowing assembly comprising:
    a plow frame coupling the snow plowing assembly to a vehicle;
    a plow blade coupled to the plow frame; and
    at least one illumination assembly configured for providing illumination for the snow plowing assembly, the at least one illumination assembly comprising:
        a housing defining an interior with an open face;
        a lens cover closing the open face of the housing and defining a front face and a bottom face; and
        a frame provided at the open face and at least partially defining a first illuminator with a light source configured to emit a trajectory of light along a forward illumination axis to define a forward illuminated area and a second illuminator with a light source configured to emit a trajectory of light along a downward illumination axis to define a downward illuminated area;
    wherein the front face of the lens cover at least partially defines the first illuminator and the bottom face of the lens cover at least partially defines the second illuminator.

15. The snow plowing assembly of claim 14 wherein the at least one illumination assembly is apart from headlights of the vehicle.

16. The snow plowing assembly of claim 14 wherein the at least one illumination assembly is positioned laterally above the plow blade and such that the trajectory of light along the forward illumination axis illuminates an area beyond the plow blade.

17. The snow plowing assembly of claim 14 wherein the at least one illumination assembly is positioned such that the trajectory of light along a downward illumination axis is primarily directed to an area behind a plow blade and in front of the vehicle.

18. The snow plowing assembly of claim 14 wherein an angle formed between the forward illumination axis and the downward illumination axis is between, or equal to, 85° and 95°.

* * * * *